United States Patent
Mack

[11] 3,879,731
[45] Apr. 22, 1975

[54] IMPEDANCE LOAD FOR RADAR TARGET CROSS SECTION CONTROL ELEMENT

[75] Inventor: Richard B. Mack, Winchester, Mass.

[73] Assignee: The United States of America as represented by the Secretary of the Air Force, Washington, D.C.

[22] Filed: Nov. 22, 1971

[21] Appl. No.: 201,233

[52] U.S. Cl. ............... 343/18 B; 343/18 A; 333/22
[51] Int. Cl. .......................................... H01g 15/14
[58] Field of Search ..................... 343/18 A, 18 B

[56] References Cited
UNITED STATES PATENTS

| | | | |
|---|---|---|---|
| 1,906,546 | 5/1933 | Darbord | 343/18 B |
| 2,828,484 | 3/1958 | Skellett | 343/18 A |
| 2,837,720 | 6/1958 | Saltzman et al. | 343/18 A |
| 3,230,531 | 1/1966 | Bischoff et al. | 343/18 B |

Primary Examiner—Maynard R. Wilbur
Assistant Examiner—G. E. Montone
Attorney, Agent, or Firm—Willard R. Matthews, Jr.

[57] ABSTRACT

Radar target cross section control can be achieved by antenna elements that are terminated by impedance loads whose impedance values decrease with increasing incident electromagnetic wave frequency. An impedance load that accomplishes this over a wide frequency band and that utilizes only passive elements is disclosed. It comprises a length of transmission-line terminated in its own characteristic impedance and having a multiplicity of reflector elements disposed along its length. The reflector elements are geometrically spaced and electrically tuned such that maximum reflection (or scattering) of electromagnetic waves occurs at points progressively closer to the load input terminal as electromagnetic wave frequency increases.

4 Claims, 4 Drawing Figures

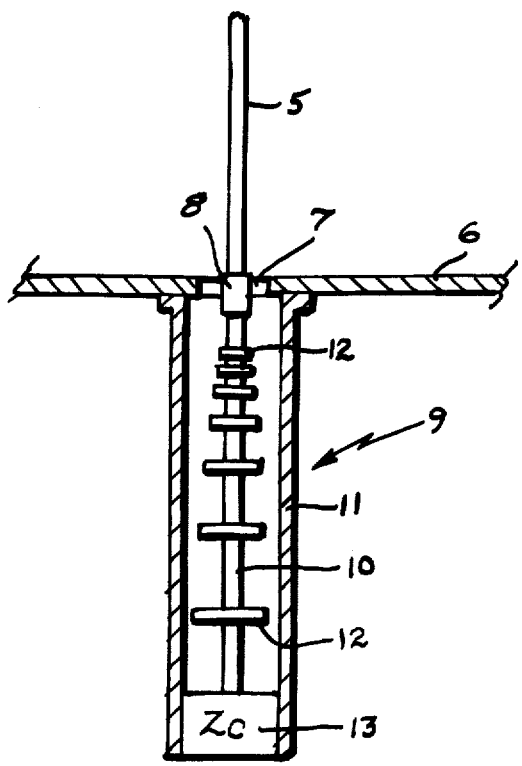
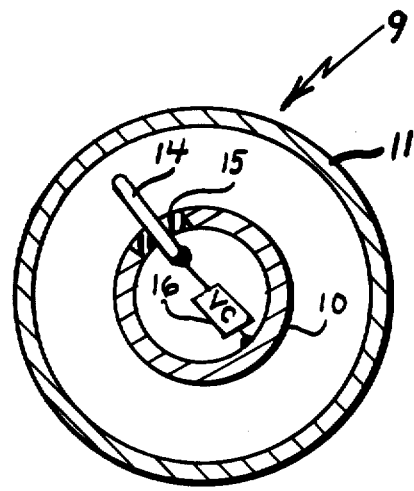
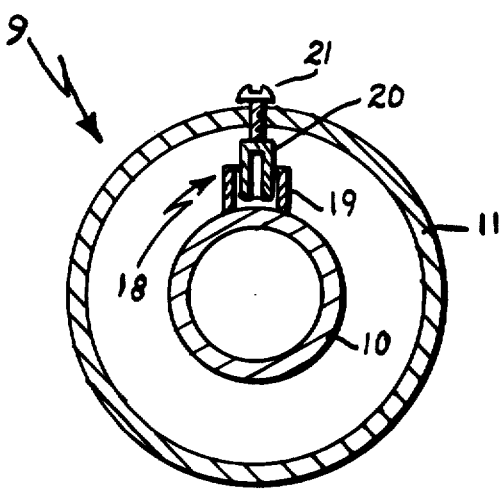
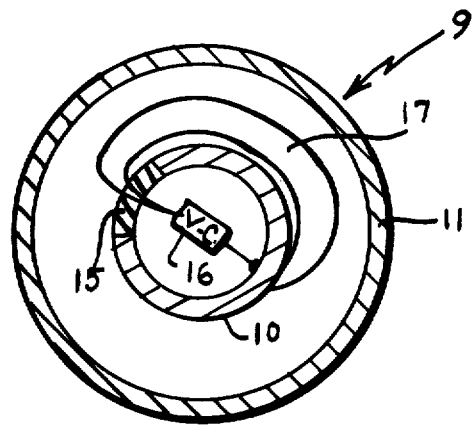

IMPEDANCE LOAD FOR RADAR TARGET CROSS SECTION CONTROL ELEMENT

BACKGROUND OF THE INVENTION

This invention relates to radar target cross section control systems, and in particular to cross section control by so-called impedance loading techniques.

Impedance loading is a technique for controlling the radar cross section of objects such as satellites, nose cones, tankage, decoys, antennas, and the like, in which a small auxiliary antenna, such as a flush slot, is added to the radar target and radar cross sections of the overall antenna-target combination are controlled by attaching proper loading impedances to the antenna terminals. The state of the art of radar target cross section control systems and the basis for the impedance loading technique is disclosed in detail in my copending U.S. Pat. application, Radar Target Cross Section Control Method And Means, Ser. No. 105,749 filed Jan. 5, 1971. It has been shown that the impedance load necessary to control the radar cross section over wide frequency bands requires a reactance with a negative frequency slope (i.e., the load impedance must decrease with increasing incident electromagnetic wave frequency). No methods are known in the current state of the art that permit construction of the required reactances at VHF and higher frequencies. Active devices of the negative impedance converter type have been constructed having the correct frequency behavior at low frequencies but have not yet been successfully demonstrated at VHF and higher frequencies. An alternative method is offered by the self-adaptive technique disclosed in my above-identified U.S. Pat. application, Ser. No. 105,749. However, this technique provides a correct loading impedance for only one frequency at any one instant of time. There currently exists, therefore, the need for a radar target cross section control element impedance load that will be accurate simultaneously for all frequencies over a very wide band and that can be constructed of passive elements. The present invention is directed toward accomplishing these and other ends.

SUMMARY OF THE INVENTION

The present invention provides means for obtaining load reactances having negative frequency slopes as required for wideband control of radar cross sections by the impedance loading method. This is accomplished by utilizing the scattering properties of a special nonuniform distribution of resonant scatterers along a section of transmission-line. The distribution is arranged so that distance between the scatterers decreases toward the input terminals and individual scatterers are adjusted to be resonant at progressively higher frequencies toward the input terminals. In this way the principal signal reflected from the scatterers back to the input terminals comes from those scatterers located closer to the input end as frequency is increased. Thus, the center of scattering moves toward the input terminals as frequency increases resulting in an input impedance having a negative slope with frequency.

It is a principal object of the invention to provide a new and improved impedance load for a radar target cross section control element.

It is another object of the invention to provide an impedance load for a radar target cross section control element that is constructed of passive elements only.

It is another object of the invention to provide an impedance load for a radar target cross section control element that provides a decreasing load impedance in response to increasing incident electromagnetic wave frequencies.

These, together with other objects, features and advantages of the invention will become more apparent from the following detailed description when taken in conjunction with the illustrative embodiments in the accompanying drawings.

DESCRIPTION OF THE DRAWINGS

FIG. 1 is a view in longitudinal section of one presently preferred embodiment of the invention;

FIG. 2 illustrates one type of reflector element suitable for use in the invention;

FIG. 3 illustrates a second alternative type of reflector element; and

FIG. 4 illustrates a third alternative type of reflector element.

DETAILED DESCRIPTION OF THE PREFERRED EMBODIMENT

The present invention comprehends a new kind of distributed transmission-line load of either passive or active elements that is designed in such a way that the region of active reflection moves toward the input terminals as frequency is increased (a condition concomitant to decreasing impedance load with increasing incident electromagnetic wave frequency), thereby satisfying the requirements for a wide-band impedance load. This load can be built in many different kinds of transmission lines including coaxial cable, striplines, waveguides, and wire lines as well as artificial transmission-lines, and can utilize many different kinds of scattering elements including conventional lumped capacitors and inductors. Its realizations and applications are not confined to any particular frequency band. An operable embodiment of the invention using a coaxial transmission-line is shown schematically in FIG. 1. The important points of FIG. 1 are: the scattering elements are nonuniformly spaced with those nearest the input terminals having closest spacings; and, the scattering elements are each tuned to yield their maximum backscatter cross section at a different frequency with those closest to the input terminals tuned to the highest frequencies. Normally, an object has its greatest scattering cross section when it is resonant so in the following description this condition will be referred to as resonance.

Referring now to FIG. 1, impedance load 9 comprises a coaxial cable transmission-line having an outer conductor 11 and an inner conductor 10, and reflector elements 12. The coaxial cable transmission-line is terminated in its characteristic impedance 13. The outer conductor 9 is directly coupled to radar target 6 and inner conductor 10 is directly coupled to radar target cross section control element 5 by means of coupler 8. The inner structure thus described is electrically isolated from radar target 6 by aperture 7 through which the coupler 8 and inner conductor 10 extend.

FIG. 2 illustrates a reflector element that can advantageously be used in the invention. In this embodiment a small thin dipole 14 insulated from inner conductor 10 by insulator 15 is electrically tunable by means of variable capacitor 16. It is desirable to make the reflector element physically small and electrically large (at the specific frequency).

FIG. 3 illustrates an alternative embodiment wherein the reflector element 17 has a geometric configuration adapted to efficiently reflect at a particular frequency.

FIG. 4 illustrates a reflector element 18 comprising a tunable capacitor consisting of concentric cylindrical plates 19 and 20. This arrangement provides simplified tuning by means of turnscrew 21.

The number of scattering elements required for a given frequency range is determined by the accuracy with which it is desired to match a given load impedance curve. Because the scattering elements are small compared to a wavelength their resonance curve, or curve of scattered power versus frequency, will be quite sharp but nevertheless will exhibit some nonzero frequency width. The resonant frequencies of adjacent scatterers will normally be chosen so that the cross over of their curves of scattering versus frequency falls within some range of the desired loading curve. In general, closer approximations to a desired curve of loading impedance will require more scattering elements.

By tuning the scattering elements to resonance as described above unwanted reflections from scatterers located away from the desired center of principal scattering at any given frequency will be eliminated, because only those elements that are approximately resonant at the given frequency will produce any significant amount of scattering.

The physical size of the scattering element within a chosen family of elements to be used is determined by the amount of backscattering that occurs with the element tuned to resonance. This is determined in turn by the magnitude of the desired reflection coefficient, calculated by standard formulas from the desired load impedance. The location of the elements along the transmission-line is chosen so that the phase of the reflection coefficient matches the desired phase, again calculated in a standard way from a desired loading impedance curve. This location of the elements is influenced by all other phase shifts encountered on the two-way path from the input terminals to the scattering center and back to the input terminals; the actual phase shift encountered at each element is a function of the element design. For some element families it can be calculated but for others both the magnitude and phase of the reflection coefficients must be determined from measured scattering matrices of the element. Thus, once the family of scattering elements is chosen and this basic information determined, the procedure outlined leads to realization of the reactances required for control of radar cross sections using the impedance loading method.

Although the present invention has been described with reference to specific embodiments, it is not intended that the same be taken in a limiting sense. Accordingly it is understood that the scope of the invention in its broader aspects is to be defined by the appended claims only and no limitation is to be inferred from definitive language used in describing the preferred embodiments.

I claim:

1. An impedance load for a radar target cross section control element comprising
   a length of transmission-line terminated in its characteristic impedance,
   a coupler engaging the unterminated end of the transmission-line to said control elements, and
   a plurality of reflecting elements disposed in spaced relationship along the transmission-line, each reflecting element being electrically tuned for maximum reflectivity at a different frequency, successive elements being spaced at increasing distances and ordered to provide maximum reflectivity at decreasing frequencies in a direction away from said coupling means.

2. An impedance load as defined in claim 1 wherein said transmission-line comprises a length of coaxial cable.

3. An impedance load as defined in claim 2 wherein said reflecting elements include variable capacitance tuning means.

4. An impedance load for a radar target cross section control element comprising
   a length of coaxial cable transmission line terminated in its characteristic impedance,
   a coupler engaging the unterminated end of the transmission line to said control element, and
   a plurality of electrically tunable reflecting elements comprising variable capacitance tuning means disposed in spaced relationship along the transmission line, said reflecting elements being tuned to effect decreasing impedance values in response to increasing electromagnetic wave frequency.

* * * * *